(12) United States Patent
Kim

(10) Patent No.: US 12,736,472 B2
(45) Date of Patent: Sep. 15, 2026

(54) OPTICAL FOREIGN SUBSTANCE DETECTION DEVICE USING LIGHT SCATTERING AND IMAGE ANALYSIS

(71) Applicant: JEDEX INC., Yongin-si (KR)

(72) Inventor: Jin Ho Kim, Suwon-si (KR)

(73) Assignee: JEDEX INC., Yongin-si (KR)

( * ) Notice: Subject to any disclaimer, the term of this patent is extended or adjusted under 35 U.S.C. 154(b) by 78 days.

(21) Appl. No.: 19/035,882

(22) Filed: Jan. 24, 2025

(65) Prior Publication Data

US 2025/0172493 A1 May 29, 2025

Related U.S. Application Data

(63) Continuation of application No. PCT/KR2023/006854, filed on May 19, 2023.

(30) Foreign Application Priority Data

Aug. 18, 2022 (KR) ........................ 10-2022-0103062

(51) Int. Cl.
*G01N 21/47* (2006.01)
*G01N 21/25* (2006.01)
*G01N 21/88* (2006.01)

(52) U.S. Cl.
CPC ............. *G01N 21/47* (2013.01); *G01N 21/25* (2013.01); *G01N 21/8806* (2013.01); *G01N 21/8851* (2013.01); *G01N 2021/4735* (2013.01); *G01N 2021/8816* (2013.01); *G01N 2021/8874* (2013.01)

(58) Field of Classification Search
CPC .... G01N 21/47; G01N 21/25; G01N 21/8806; G01N 21/8851; G01N 2021/4735; G01N 2021/8816; G01N 2021/8874; G01N 15/02; G01N 21/17; G01N 21/49; G01N 21/88; G01N 21/94
See application file for complete search history.

(56) References Cited

U.S. PATENT DOCUMENTS 5,101,113 A * 3/1992 Hirleman, Jr ...... G01N 15/0211 356/336

FOREIGN PATENT DOCUMENTS

KR 10-2005-0065155 A 6/2005
KR 10-2005-0102324 A 10/2005
KR 10-0763942 B1 10/2007

(Continued)

*Primary Examiner* — Tony Ko
(74) *Attorney, Agent, or Firm* — NKL Law; Jae Youn Kim

(57) ABSTRACT

Provided is an optical foreign substance detection device using light scattering and image analysis to detect and analyze a foreign substance included in a target object, and the optical foreign substance detection device includes an optical housing; a light irradiation unit connected to and installed in a lower portion of the optical housing, and has a plurality of light sources arranged to irradiate light toward the target object below that the light sources irradiate light so that light scattering is generated by a foreign substance; an optical unit built into an upper portion of the optical housing, and captures the target object so the foreign substance included in the target object is detected by using light scattering of the foreign substance by the light irradiated from the light source and creates an image; and a user device that receives, stores, reproduces, and analyzes the image created from the optical unit.

7 Claims, 13 Drawing Sheets

(56) References Cited

FOREIGN PATENT DOCUMENTS

| | | | |
|---|---|---|---|
| KR | 10-1809009 | B1 | 12/2017 |
| KR | 10-2020-0052157 | A | 5/2020 |
| KR | 10-2291166 | B1 | 8/2021 |

* cited by examiner

FIG. 6

OPTICAL FOREIGN SUBSTANCE DETECTION DEVICE USING LIGHT SCATTERING AND IMAGE ANALYSIS

TECHNICAL FIELD

The present invention relates to a foreign substance detection device, and more specifically, to an optical foreign substance detection device capable of detecting and analyzing a foreign substance by using light scattering and image analysis in combination to confirm the size, shape, area, color, or the like of the foreign substance, having a fast processing speed for foreign substance detection and image analysis, and capable of detecting foreign substances smaller than a pixel limit.

BACKGROUND ART

In general, as industries become more advanced, the need to control foreign substances such as dust not only in office environments but also in production sites has increased, and clean rooms have been introduced to keep the production sites clean and prevent foreign substances from having a negative impact on products.

In particular, in cutting-edge industries that involve highly precise manufacturing processes at the nano level, such as semiconductors and displays, minute environmental conditions at the manufacturing site may also have a significant impact on product quality, so the cleanliness required in clean rooms is becoming increasingly stricter.

Displays are used in areas such as mobile phones, tablet PCs, monitors, home appliances, and automotive electronics, and are manufactured using OCA films, polarizing films, and glass. When a foreign substance larger than a certain size exists in these display films, the foreign substance may cause pixel defects or deteriorate image quality. In addition, when the foreign substance larger than a certain size is included in various films used for building windows or interior interiors, product defects occur.

Conventional foreign substance detection devices for detecting such foreign substances irradiation light to a sample and measure the concentration of particles using light scattered by the foreign substances. The scattered light is reflected directly or by a mirror and focused onto a light-receiving unit, and the amount of focused light is measured using an electrical signal, thereby enabling the number of foreign substances and approximate sizes of the foreign substances to be known. However, foreign substance detection devices of this type have the problem that it is not possible to know the type, actual size, shape, major and minor axis lengths, area, and color of the foreign substances.

In addition, foreign substances can be detected using an optical microscope device, but there are problems that it is difficult to detect foreign substances smaller than the limit of the detectable pixels of the image sensor connected to the optical microscope device although such a device can determine the actual size, shape, area, color, or the like of the foreign substance, and that the detection time is long.

As a related art, Korean Laid-open Patent Publication No. 10-2020-0052157 (published on May 14, 2020) discloses a digital microscope including a stage on which a sample is placed, a low-magnification optical module which images the sample to create a low-magnification image, a high-magnification optical module which images the sample to create a high-magnification image and is positioned on the opposite side of the low-magnification optical module with respect to the sample, a drive module which moves the high-magnification optical module, and a user device which reproduces the low-magnification image and the high-magnification image, in which an imaging region of the high-magnification optical module is changed by driving the drive module.

However, since the above-described conventional technology uses direct light, it is not easy to detect small-sized foreign substances, and when a plurality of foreign substances are present, it takes a long time to detect the foreign substances, and since the entire area of the sample must be identified with a low-magnification image and then a high-magnification optical module must be moved to the area where the foreign substance is detected to perform precise observation, there are problems in that the detection time is long, the operation is complicated, and the equipment is large and thus takes up a lot of space.

In addition, since the sample is observed by placing the sample on the stage in the above-described conventional technology, the stage must always be provided, so there are limitations on the type, size, or weight of the sample that can be placed on the stage, and there is a problem that it is difficult to carry or move the entire device for use.

DISCLOSURE

Technical Problem

The present invention has been devised to solve all of the above problems, and an object of the present invention is to provide an optical foreign substance detection device using light scattering and image analysis, which can rapidly detect and analyze foreign substances by using light scattering and image analysis in combination to confirm the actual size, shape, area, color, and the like of the foreign substance, and can determine a path through which the foreign substance is introduced, thereby enabling contamination control in a clean room, has a fast processing speed for foreign substance detection and image analysis, can detect foreign substances smaller than the pixel limit of an image sensor, prevents foreign substance detection errors to ensure high reliability, can be used by placing the detection device on a target object without a stage, and is portable and can be easily moved to the target object for use.

Technical Solution

In order to solve the above problem, the present invention provides an optical foreign substance detection device using light scattering and image analysis to detect and analyze a foreign substance included in a target object, including: an optical housing; a light irradiation unit that is connected to and installed in a lower portion of the optical housing, and has a plurality of light sources arranged to irradiate light toward the target object below, wherein the light sources irradiate light with a predetermined light amount so that light scattering can be generated by a foreign substance; an optical unit that is built into an upper portion of the optical housing, and captures the target object so that the foreign substance included in the target object is detected by using light scattering of the foreign substance by the light irradiated from the light source and creates an image; and a user device that receives, stores, reproduces, and analyzes the image created from the optical unit, wherein the user device calculates a light-scattered standard particle amplification length value by light irradiation according to a standard particle length value for multiple standard particles in advance, creates a graph regarding a correlation between the standard particle length value and the standard particle amplification length value, stores the graph as a comparison criterion for a foreign substance length value, calculates a light-scattered foreign substance amplification length value in one or more directions for the foreign substance detected from the image of the target object captured by the optical unit, derives a standard particle length value corresponding to the same standard particle amplification length value as the foreign substance amplification length value from the comparison criterion to determines the standard particle length value as the foreign substance length value, and confirms a size, shape, and area of the foreign substance from the foreign substance length value.

Advantageous Effects

According to the present invention, by using the light scattering and image analysis in combination, foreign substances can be detected and analyzed to confirm the actual size, shape, area, color, and the like of the foreign substances, and the path through which the foreign substances are introduced can be determined, thereby enabling contamination control in a clean room, the processing speed for foreign substance detection and image analysis is fast, foreign substances smaller than the pixel limit of the image sensor can be detected, foreign substance detection errors are prevented to ensure high reliability, and the detection device can be used by being placed on the target object without a stage, and the detection device is portable and can be easily moved to a target object for use.

BRIEF DESCRIPTION OF THE DRAWINGS

Figure 6:
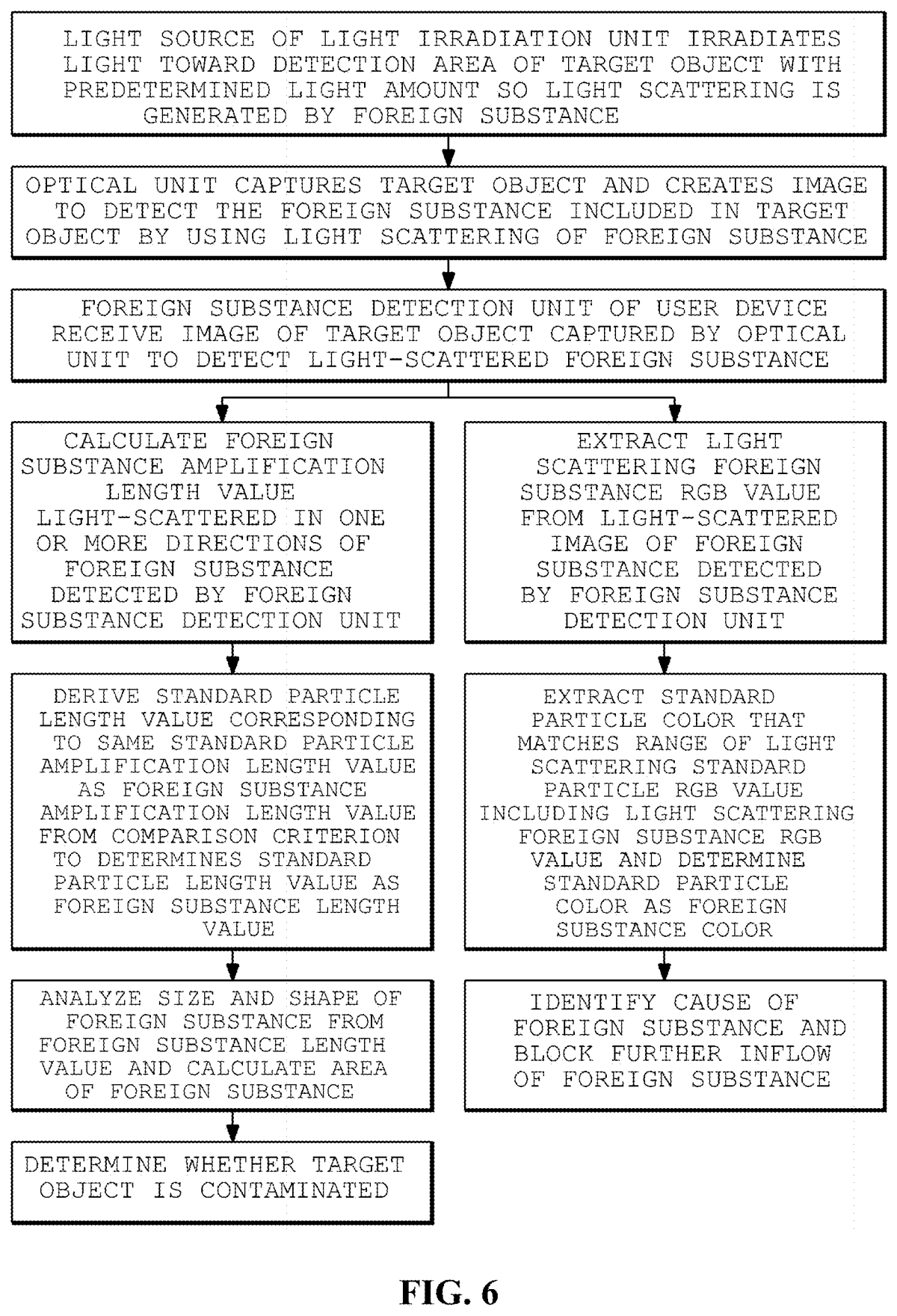

FIG. 6 is a flow chart illustrating a detection and analysis method of the optical foreign substance detection device according to an embodiment of the present invention.

BEST MODE

Figure 1:
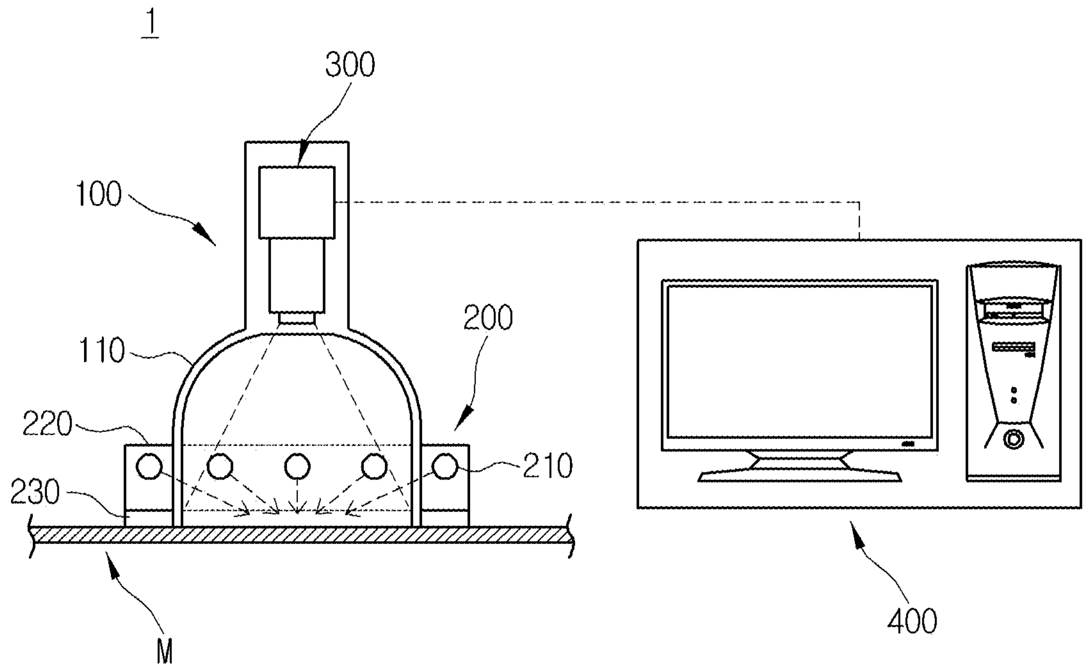
FIG. 1 is a diagram illustrating a configuration of an optical foreign substance detection device according to an embodiment of the present invention.

The optical foreign substance detection device 1 according to the present invention detects and analyzes a foreign substance F contained in a target object M such as a film, a substrate, a panel, or equipment by using light scattering and image analysis in combination, can confirm the size, shape, area, color, and the like of the foreign substance F, has a fast processing speed for foreign substance detection and image analysis, can detect foreign substances smaller than the pixel limit, and can be used by being placed on the surface of the target object M without a stage. Referring to FIG. 1, the device 1 includes an optical housing 100, a light irradiation unit 200, an optical unit 300, and a user device 400, and may further include a foreign substance type analyzer (not illustrated).

Figure 2A:
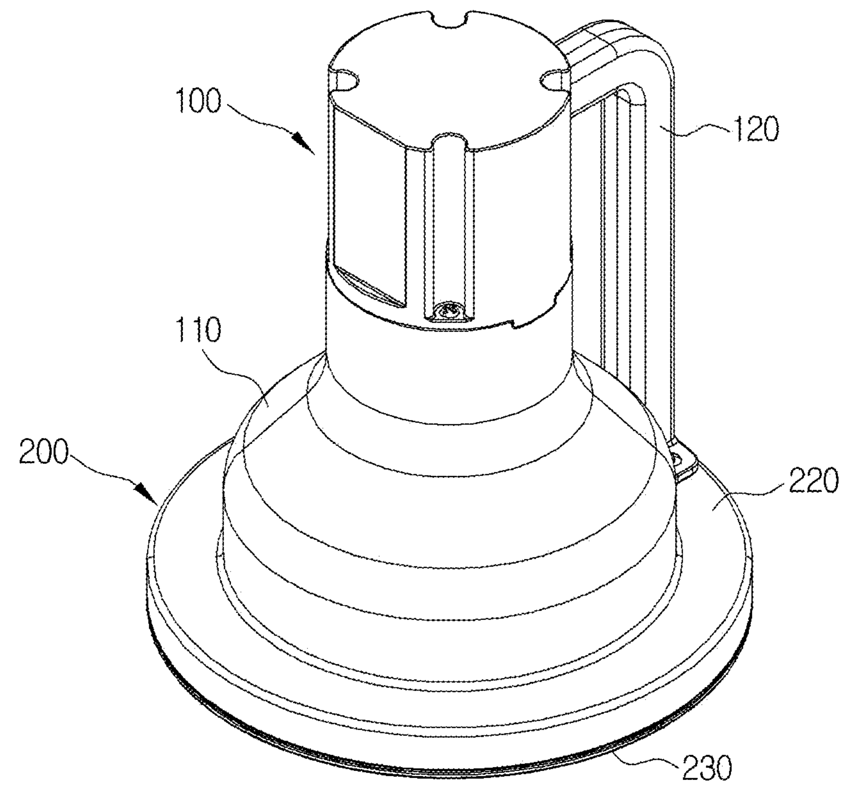
FIG. 2A is a perspective view of the optical foreign substance detection device according to an embodiment of the present invention.
Figure 2B:
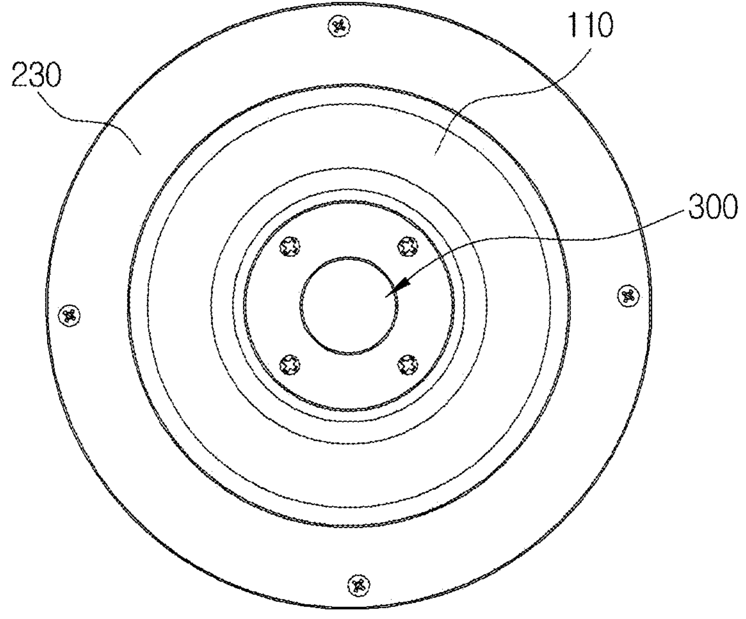
FIG. 2B is a bottom view of the optical foreign substance detection device.
Figure 2C:
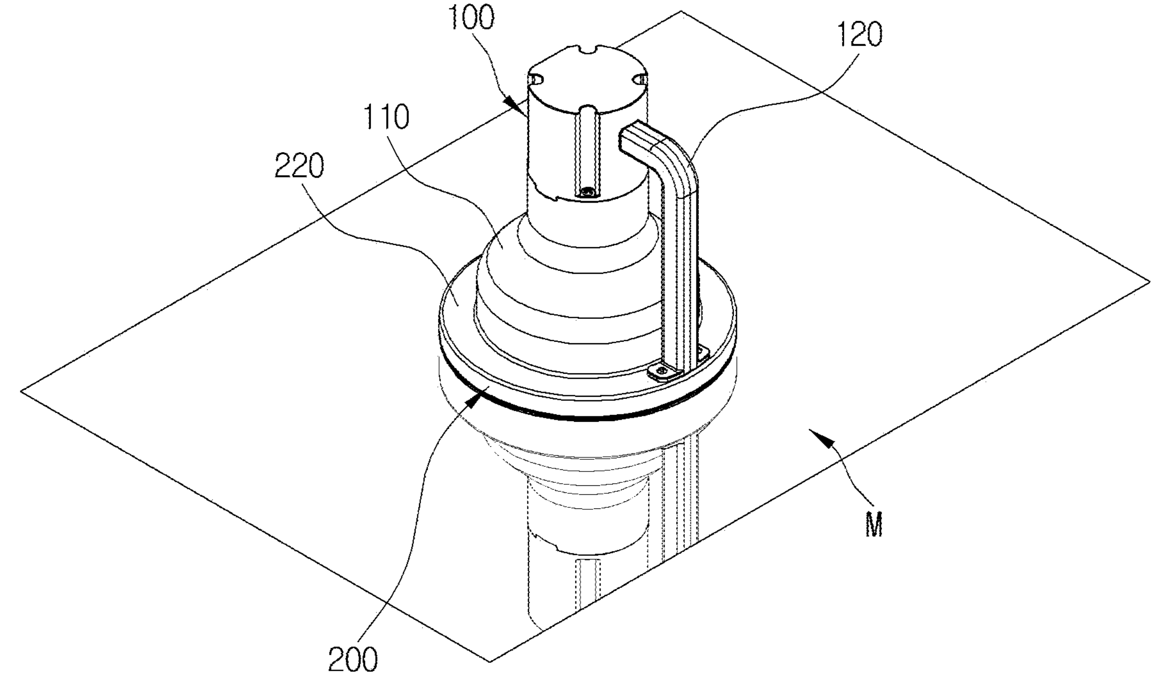
FIG. 2C is a diagram illustrating a state in which the optical foreign substance detection device is in use.

Referring to FIGS. 2A to 2C, the optical housing 100 according to an embodiment of the present invention has an optical unit 300 built into the upper portion of the optical housing, a light irradiation unit 200 connected to and installed in the lower portion of the optical housing, a light scattering unit 110 formed between the optical unit 300 and the light irradiation unit 200, and a handle 120 formed on the outside for carrying and moving the optical housing. The optical housing 100 may be equipped with an adjustment means (not illustrated) capable of adjusting the focal length of the optical unit 300.

The light scattering unit 110 provides a dark room inside and is irradiated with light from a plurality of light sources 210 of the light irradiation unit 200 on the lower side. Accordingly, the light is scattered by the foreign substance F included in the target object M, and then received by the optical unit 300. To this end, the light scattering unit 110 is formed so that the diameter gradually decreases as it goes upward and converges on the light irradiation unit 200. When a user holds the handle 120 and places the optical housing 100 on the surface of the target object M, a dark room is created in the light scattering unit 110, and the surface of the target object M corresponding to the inner diameter of the light irradiation unit 200 becomes a detection area.

Figure 3A:
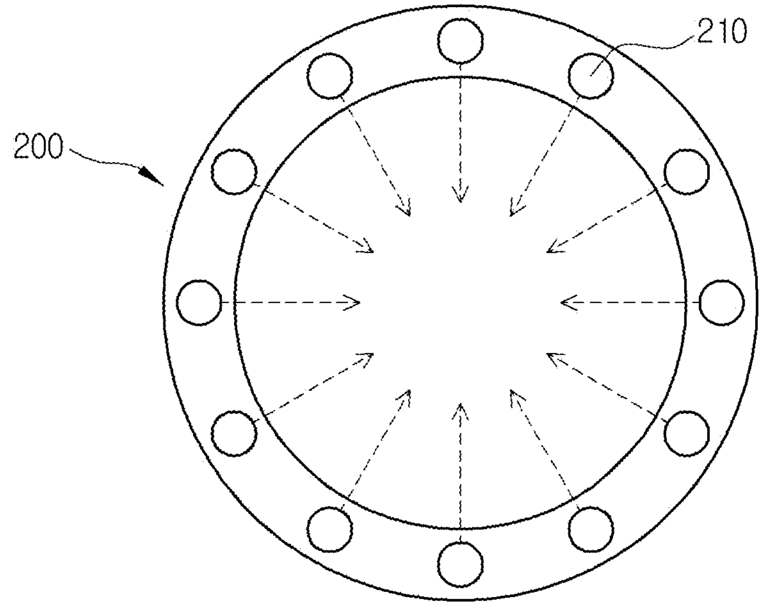
FIGS. 3A and 3B are diagrams illustrating the arrangement configuration of a light irradiation unit according to an embodiment of the present invention.

Referring to FIG. 3A, the light irradiation unit 200 is connected to and installed in the lower portion of the optical housing 100, the plurality of light sources 210 are arranged to irradiate light from the side toward the detection area of the target object M below, the light sources 210 irradiate light with a predetermined light amount so that light scattering can be generated by the foreign substance F included in the target object M, the optical unit 300 may create an image including scattered light whose size is amplified by being scattered by the foreign substance F, and the user device 400 detects and analyzes the foreign substance F included in the target object M.

In an embodiment, the light irradiation unit 200 is connected to the lower portion of the light scattering unit 110 so that a ring-shaped light irradiation ring 220 protrudes outwardly, and the light irradiation ring 220 has an accommodation space formed inside, and a through hole having the same inner diameter as the inner diameter of the lower portion of the light scattering unit 110 is formed inside. The plurality of light sources 210 are arranged symmetrically to each other along the accommodation space inside the light irradiation ring 220 to irradiate light with a predetermined light amount toward the target object M in a plurality of directions. The plurality of light sources 210 may be arranged symmetrically to each other in the plurality of directions, such as 4 directions, 6 directions, 8 directions, 10 directions, 12 directions, 14 directions, and 16 directions, to irradiate light toward the detection area of the target object M. A light diffusion plate (not illustrated) may be installed in front of the light sources 210 to increase the uniformity of the light amount distribution.

In addition, a sealing ring 230 is coupled to the lower portion of the light irradiation ring 220 to come into close contact with the surface of the target object M, thereby preventing external light from entering the interior of the optical housing 100 and interfering with it, and providing the dark room.

For example, the sealing ring 230 may contain 30 to 50% by weight of polyphenylene sulfide resin, 15 to 25% by weight of SBR, 10 to 20% by weight of polyurethane resin, 10 to 20% by weight of polymethyl methacrylate, 5 to 10% by weight of 2-mercaptoadenine, and 1 to 5% by weight of a light absorber.

The polyphenylene sulfide resin is a semi-crystalline thermoplastic resin produced by the reaction of p-dichlorobenzene and sodium sulfide, which has excellent heat resistance, chemical resistance, weather resistance and mechanical strength, and is added in an amount of 30 to 50 wt %. The SBR is a styrene butadiene synthetic rubber, which has excellent strength, wear resistance and elasticity, and can provide friction to a contact surface, and is added in an amount of 15 to 25 wt %. The polyurethane resin provides strength that can maintain elasticity and hardness, thereby preventing cracks, and exhibiting sticky properties to increase adhesion, and has excellent contamination resistance, and in particular, when added together with polyphenylene sulfide resin and SBR, the polyurethane resin increases properties such as elasticity, viscosity, toughness, and weather resistance, and greatly improves the modifying effect, and is therefore added in an amount of 10 to 20 wt %. The polymethyl methacrylate increases the bonding force between particles with excellent viscosity and adhesiveness, and is added in an amount of 10 to 20 wt %. The 2-mercaptoadenine is added in an amount of 5 to 10 wt %, and has needle-shaped microcrystals to form a long-term stable and dense coating, thereby improving water-tightness, suppressing cracks, contributing to stable strength enhancement, and preventing oxidation caused by exposure to air and light. The light absorbent is added in an amount of 1 to 5 wt % to absorb light, thereby preventing reflected light from occurring, and increasing detection accuracy.

In addition, when light is irradiated only from one direction of the detection area of the target object M and the plurality of foreign substances F are included in the detection area of the target object M, a shaded section may occur on the rear surface of any foreign substance F, and a problem may occur in which it is difficult to properly detect other adjacent foreign substances F due to this shaded section. The present invention is configured such that the plurality of light sources 210 are arranged symmetrically along the perimeter of the detection area of the target object M on which the optical housing 100 is placed, so that light is irradiated from the plurality of directions at a predetermined light amount toward the detection area of the target object M to prevent the detection of the foreign substance F from being missed due to the shaded section, thereby improving the detection reliability. In this case, the light source 210 may be an LED, a laser, or the like.

In addition, it is preferable that the light irradiation unit 200 has a light irradiation angle of 1 to 60 degrees for the target object M of the light source 210, and when the light irradiated from the light source 210 is reflected by the foreign substance F, light scattering, which spreads the light, occurs and increases the detection size that the image sensor of the optical unit 300 can accept, thereby increasing the detection power. Moreover, the foreign substance F can be quickly detected and analyzed from the image captured by the optical unit 300, and the foreign substance F that is smaller than a size detectable by the optical unit 300 or that does not reflect light well can also be detected. In this case, when the light irradiation angle exceeds 60 degrees, the detection power enhancement effect due to light scattering may be reduced when the light is reflected by a foreign substance F, and when the light irradiation angle is less than 1 degree, in the case of detecting a foreign substance F for the target object M that is convexly bent upward or downward, a part of the target object M may be outside the light irradiation range, resulting in the omission of detection of the foreign substance F.

Figure 3B:
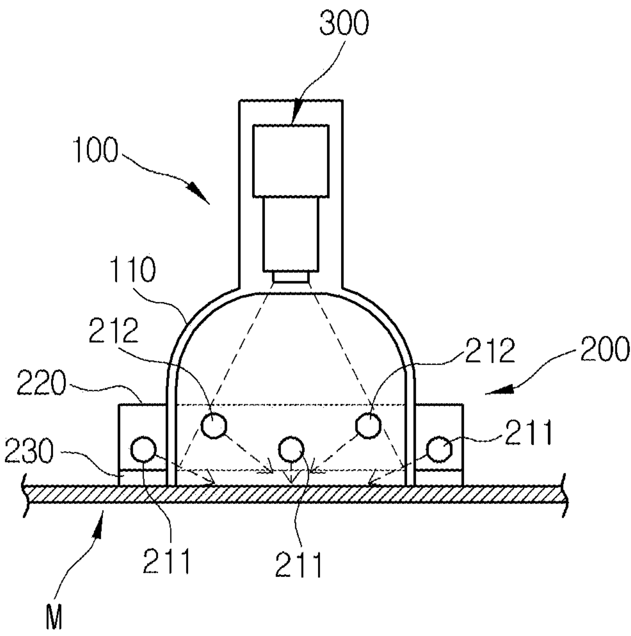

As an embodiment, referring to FIG. 3B, the light source 210 of the light irradiation unit 200 may include a plurality of lower light sources 211 arranged symmetrically to each other, and a plurality of upper light sources 212 installed at a position higher than the lower light sources 211 and arranged symmetrically to each other. The lower light source 211 and the upper light source 212 are alternately arranged along the light irradiation unit 200 to irradiate light at different angles, and the light irradiation angle of the lower light source 211 is a low angle of 1 to 30 degrees, and the light irradiation angle of the upper light source 212 is a high angle of 31 to 60 degrees. By irradiating light at low and high angles by the lower light sources 211 and the upper light sources 212 arranged alternately and symmetrically in this way, detection errors in which scattered light of small foreign substances obscured by scattered light of large foreign substances is not detected when the plurality of foreign substances F are adjacent to each other can be prevented, thereby increasing detection reliability.

In addition, the plurality of lower light sources 211 and the plurality of upper light sources 212 may be alternately and symmetrically arranged in the accommodation space of one light irradiation ring 220, but the light irradiation ring 220 may be formed to be divided into a lower light irradiation ring and an upper light irradiation ring above the lower light irradiation ring, and the plurality of lower light sources 211 may be symmetrically arranged in the lower light irradiation ring, and the upper light sources 212 may be symmetrically arranged in the upper light irradiation ring.

The optical foreign substance detection device 1 according to the present invention can detect a foreign substance F with the optical unit 300 by additionally installing a stage (not illustrated) on the lower side of the light irradiation unit 200 and placing the target object M on the stage. However, it is also possible to use the device by easily moving the optical housing 100 without the stage and placing the optical housing 100 on the portion of the target object M where the foreign substance F is to be detected.

The optical unit 300 is built into the upper portion of the optical housing 100, includes an image sensor, and captures the target object M so as to detect the foreign substance F contained in the target object M using light scattering of the foreign substance F by light irradiated from the plurality of light sources 210 and creates the image.

Since the image captured by the optical unit 300 illustrates the light scattering that occurs when light irradiated from the plurality of light sources 210 is reflected by the foreign substance F, the detection power can be enhanced by increasing the detection size that the image sensor of the optical unit 300 can accept, the foreign substance F can be detected and confirmed easily and quickly, and the foreign substance F smaller than the size that can be originally detected by the optical unit 300 can also be detected. For example, when an image is made by gathering several very small squares called pixels, and the detectable pixel size of the image sensor of the optical unit 300 is 1 μm, the image sensor cannot detect the foreign substance F smaller than 1 µm. However, as described above, when light scattering is used, the foreign substance F is light-scattered and amplified compared to the original size, so a small foreign substance F that is about ⅓ of the size that can be originally detected by the image sensor of the optical unit 300 can also be detected.

The user device 400 may be electronic devices such as a computer, laptop, smart phone, tablet PC, PDA, and the like, which receive, store, reproduce, and analyze the image captured by the optical unit 300, and include a display screen and a communication module, and may be connected to the optical unit 300 via wired or wireless communication. The user device 400 is installed with a dedicated program capable of detecting and analyzing the foreign substance F from the image.

The user device 400 may include a standard particle amplification length value calculation unit 410, a foreign substance length value comparison criterion storage unit 420, a foreign substance detection unit 430, a foreign substance amplification length value calculation unit 440, a foreign substance length value determination unit 450, a foreign substance analysis unit 460, and a determination unit 480.

Standard particles are commercially available by size and color, and multiple standard particles are prepared in advance by size, the standard particles are placed on the surface of a target object M, and the optical foreign substance detection device 1 of the present invention is used to irradiate the target object M with light from the plurality of light sources 210 at a predetermined light amount so that light scattering occurs by the standard particles, and then when the image captured by the optical unit 300 is received by the user device 400, the standard particle amplification length value calculation unit 410 measures and calculates the light-scattered standard particle amplification length value according to each standard particle length value from the image.

Figure 4A:
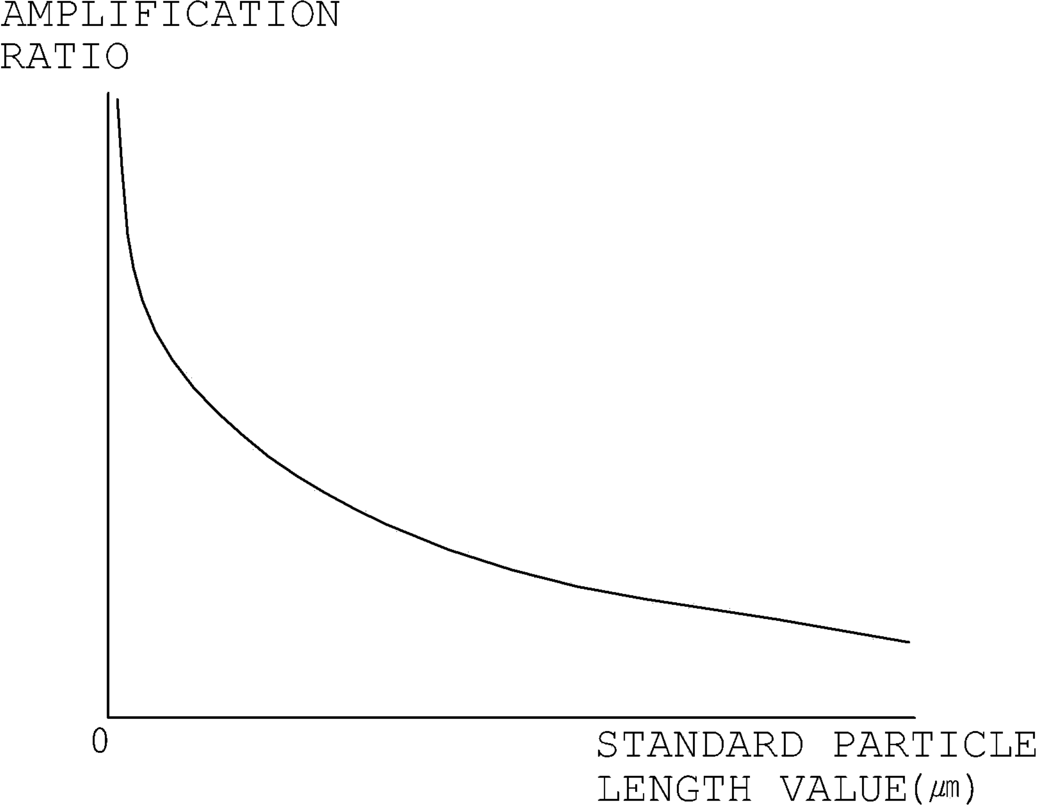
FIG. 4A is a graph schematically illustrating the correlation of a scattered amplification ratio of a standard particle according to a standard particle length value according to an embodiment of the present invention.

According to the experimental results of the present inventor, there is a correlation that as the actual standard particle length value increases, the light scattering amplification ratio of the standard particle decreases. In this case, the amplification ratio is a “standard particle amplification length value/standard particle length value”. The x-axis represents the standard particle length value, the y-axis represents the amplification ratio, and when each value is input into a dedicated program, and the points corresponding to the values input into the x-axis and y-axis are connected with a trend line using the dedicated program, a right-downward sloping curve graph with a sharp decrease in slope is created, as in FIG. 4A.

For example, the light scattering amplification ratio of the standard particle may be 3.5 times when the standard particle length value is 0.4 µm, the light scattering amplification ratio of the standard particle may be 3 times when the standard particle length value is 1 µm, the light scattering amplification ratio of the standard particle may be 2.5 times when the standard particle length value is 10 µm, the light scattering amplification ratio of the standard particle may be 2 times when the standard particle length value is 100 µm, and the light scattering amplification ratio of the standard particle may be 1.2 times when the standard particle length value is 1,000 µm.

Therefore, as an embodiment, standard particles having circular cross sections of the standard particle length values of 0.1 µm, 0.2 µm, 0.3 µm, 0.4 µm, 0.5 µm, 0.6 µm, 0.7 µm, 0.8 µm, 0.9 µm, 1 µm, 5 µm, 10 µm, 50 µm, 100 µm, 500 µm and 1,000 µm are prepared, respectively, and after capturing the light-scattered image of the standard particle by light irradiation using the optical foreign substance detection device 1 of the present invention, the standard particle amplification length value calculation unit 410 can calculate the light-scattered standard particle amplification length value from the image. For example, when the standard particle length value is 0.4 µm, the light scattering amplification ratio of the standard particle detected in the image may be 3.5 times, and therefore the standard particle amplification length value may be 1.4 µm, when the standard particle length value is 1 µm, the light scattering amplification ratio of the standard particle detected in the image may be 3 times, and therefore the standard particle amplification length value may be 3 µm, when the standard particle length value is 10 µm, the light scattering amplification ratio of the standard particle detected in the image may be 2.5 times, and therefore the standard particle amplification length value may be 25 µm, when the standard particle length value is 100 µm, the light scattering amplification ratio of the standard particle detected in the image may be 2 times, and therefore the standard particle amplification length value can be 200 µm, and when the standard particle length value is 1,000 µm, the light scattering amplification ratio of the standard particle detected in the image may be 1.2 times, and therefore the standard particle amplification length value may be 1,200 µm.

The foreign substance length value comparison criterion storage unit 420 creates a graph regarding the correlation between the standard particle length value and the standard particle amplification length value calculated by the standard particle amplification length value calculation unit 410 and stores the graph as a comparison criterion for the foreign substance length value.

Figure 4B:
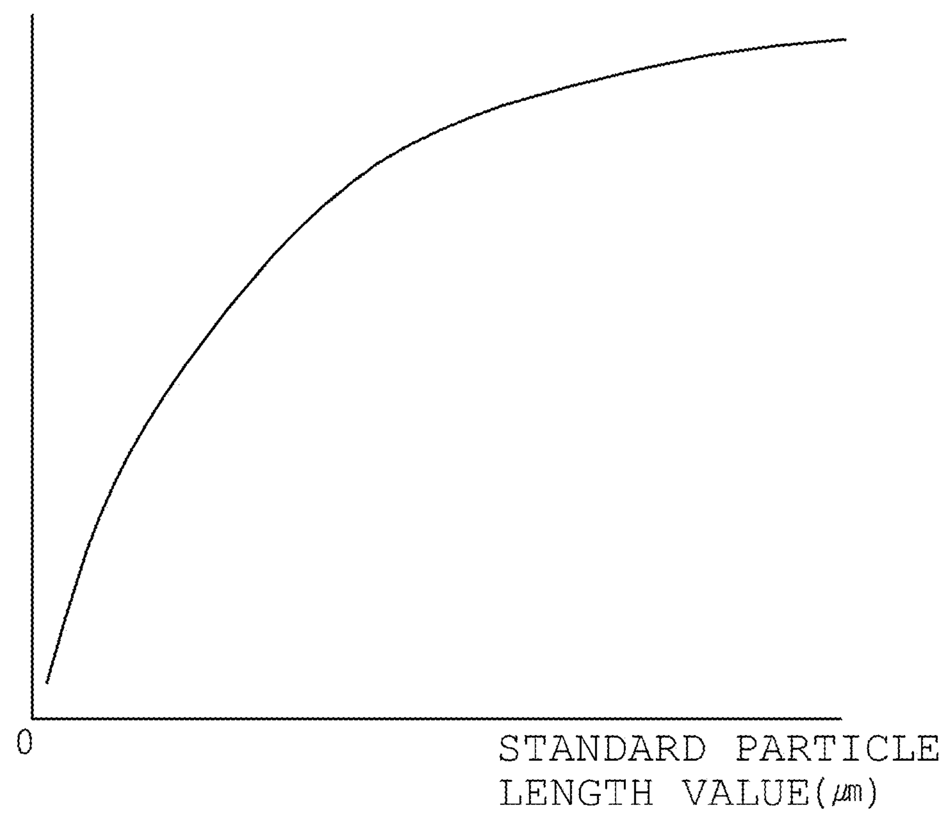
FIG. 4B is a graph schematically illustrating the correlation of a standard particle amplification length value according to a standard particle length value according to an embodiment of the present invention.

For example, when the x-axis represents the standard particle length value, the y-axis represents the standard particle amplification length value, each value is input into a dedicated program, and the dedicated program is used to connect the points corresponding to the values input into the x-axis and y-axis with a trend line, a right-upward sloping curve graph with a sharp decrease in slope is created, as in FIG. 4B. In this case, when the intervals between the values on the x-axis are narrowed and the standard particle amplification length values are calculated in advance for more standard particle length values and the graph is created, the accuracy of the comparison standard will increase further.

The foreign substance detection unit 430 detects light-scattered foreign substance F using light scattering of the foreign substance F by photometry irradiated from the light source 210 from the image transmitted by capturing the target object M by the optical unit 300, and one or more light-scattered foreign substances F can be detected in the image.

The foreign substance amplification length value calculation unit 440 calculates the foreign substance amplification length value amplified by the foreign substance F detected by the foreign substance detection unit 430 through light scattering. The foreign substance amplification length value calculation unit 440 can calculate the foreign substance amplification length values in two or more directions from the light-scattered shape of the foreign substance F, and at this time, the foreign substance amplification length values of the major and minor axes of the foreign substance F can be calculated, respectively.

The foreign substance length value determination unit 450 derives the standard particle length value corresponding to the standard particle amplification length value which is the same as the foreign substance amplification length value from the comparison criterion of the foreign substance length value comparison criterion storage unit 420 and determines the derived standard particle length value as an actual foreign substance length value. The foreign substance length value determination unit 450 can derive the foreign substance length values in the plurality of directions of the foreign substance F, and as the number of foreign substance length values in the multiple directions derived from one foreign substance F increases, the accuracy of the size and shape of the foreign substance F increases accordingly. However, in the case of a microscopic foreign substance F in micrometer units, since the shape is not complex but simple, when the foreign substance length values in several directions are derived, the actual shape of the foreign substance can be easily identified by considering the light-scattered shape together. For example, the shape of the foreign substance F may be derived using the foreign substance length values of the major and minor axes.

The foreign substance analysis unit 460 analyzes the size and shape of the foreign substance F from one or more foreign substance length values determined by the foreign substance length value determination unit 450 and calculates the area of the foreign substance F. For example, when the foreign substance length values derived in the plurality of directions are almost the same, the shape of the foreign substance may be analyzed as a circle, when the foreign substance length values in the plurality of directions are different from each other, the shape of the foreign substance F can be analyzed as a shape other than a circle, and when the length of the major axis is much longer than the minor axis, the shape of the foreign substance F may be analyzed as a fibrous form, and if the size and shape of the foreign substance Fare analyzed in this way, the area of the foreign substance F may also be easily calculated using a dedicated program.

The determination unit 480 determines whether the target object M is contaminated based on the information analyzed by the foreign substance analysis unit 460. The determination of whether the target object M is contaminated varies depending on the type of the target object M, the size, shape, and spacing of the foreign substance F, or the like. For example, in the case of a fibrous foreign substance F, the fibrous foreign substance may not have a significant effect on the contamination of a specific target object M, and in such a case, the fibrous foreign substance may be determined to be a normal product.

Hereinafter, a process of detecting a foreign substance F using the optical foreign substance detection device 1 according to the present invention and analyzing the size and shape of the foreign substance F will be described with an embodiment.

For example, the light scattering amplification ratio of the standard particle is assumed to be 3.5 times when the standard particle length value is 0.4 μm, the light scattering amplification ratio of the standard particle is assumed to be 3 times when the standard particle length value is 1 μm, the light scattering amplification ratio of the standard particle is assumed to be 2.5 times when the standard particle length value is 10 μm, the light scattering amplification ratio of the standard particle is assumed to be 2 times when the standard particle length value is 100 μm, the light scattering amplification ratio of the standard particle is assumed to be 1.6 times when the standard particle length value is 300 μm, the light scattering amplification ratio of the standard particle is assumed to be 1.5 times when the standard particle length value is 500 μm, and the light scattering amplification ratio of the standard particle is assumed to be 1.2 times when the standard particle length value is 1,000 μm.

Figure 5A:
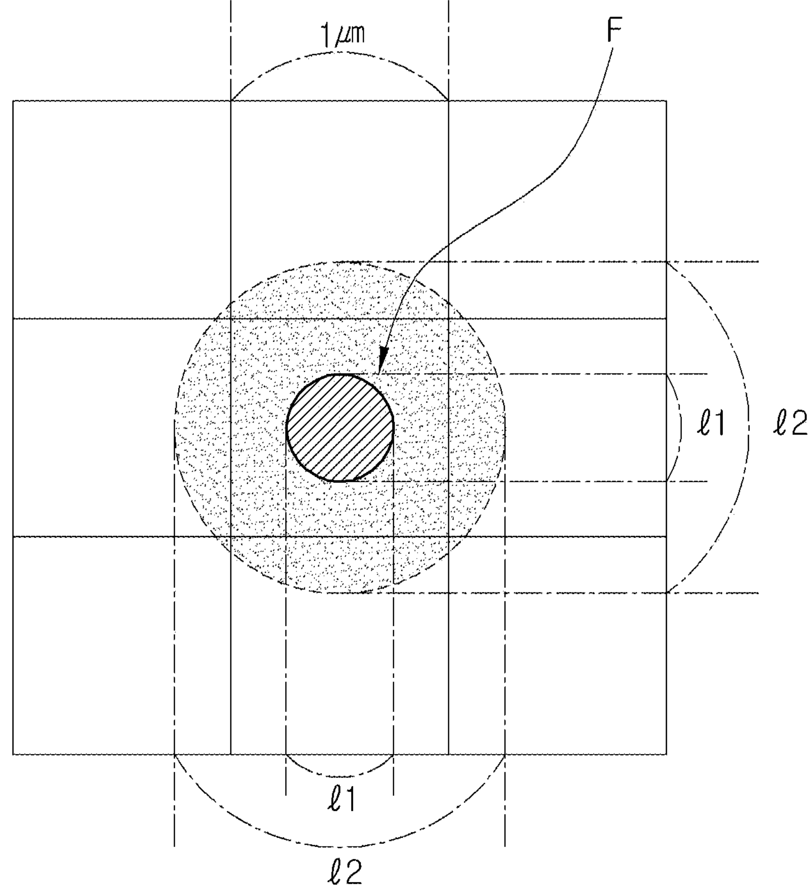
FIGS. 5A to 5D are diagrams schematically illustrating a part of a light-scattered image according to the size and shape of a foreign substance according to an embodiment of the present invention.

Moreover, referring to FIG. 5A, when it is assumed that the detectable limit pixel size of the image sensor of the optical unit 300 is 1 μm, in a case where the foreign substance amplification length value calculation unit 440 calculates a foreign substance amplification length value $\ell 2$ of the light-scattered foreign substance F detected by the foreign substance detection unit 430 as 1.4 μm, the foreign substance length value determination unit 450 derives 0.4 μm, which is a standard particle length value corresponding to the standard particle amplification length value of 1.4 μm, which is the same as the foreign substance amplification length value $\ell 2$ of 1.4 μm, from the foreign substance length value comparison criterion storage unit 420 and determines 0.4 μm as a foreign substance length value $\ell 1$. In addition, when the foreign substance length value $\ell 1$ is derived from the foreign substance amplification length value $\ell 2$ in a plurality of directions, since the foreign substances are all the same, the foreign substance may be determined as a circular foreign substance F, and the foreign substance F smaller than 1 μm, which is the pixel limit of an image sensor, cannot be detected by a conventional optical detection device, but as described above, in the above-described embodiment of the present invention, detection of the foreign substance F smaller than the pixel limit of the image sensor is possible.

Figure 5B:
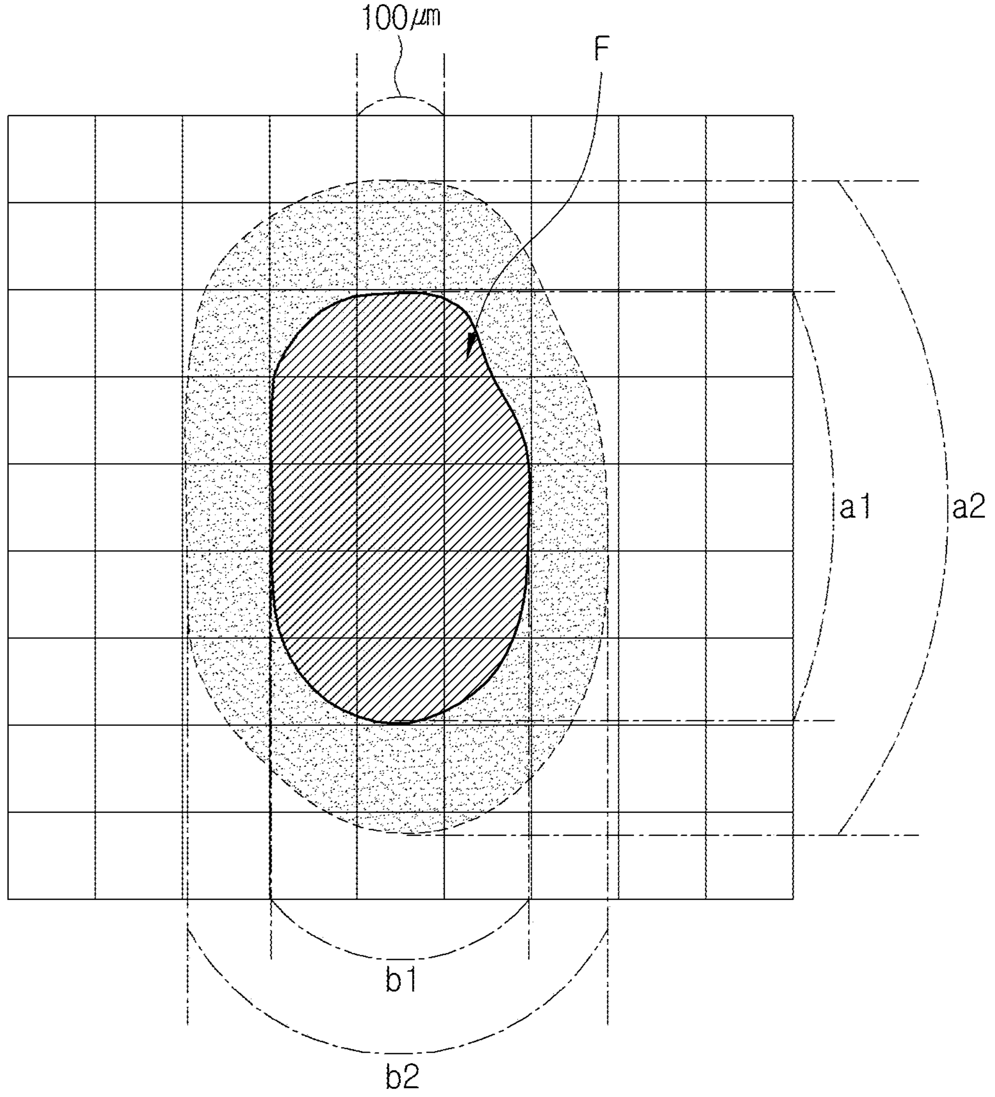

In addition, referring to FIG. 5B, when the foreign substance amplification length value calculation unit 440 calculates s foreign substance amplification length value a2 of the major axis of the light-scattered foreign substance F detected by the foreign substance detection unit 430 as 750 μm and calculates a foreign substance amplification length value b2 of the minor axis as 480 μm, the foreign substance length value determination unit 450 derives 500 μm, which is a standard particle length value corresponding to the standard particle amplification length value of 750 μm, from the foreign substance length value comparison criterion storage unit 420 and determines 500 μm as a foreign substance length value a1 of the major axis, and derives 300 μm, which is the standard particle length value corresponding to the standard particle amplification length value of 480 μm, from the foreign substance length value comparison criterion storage unit 420 and determines 300 μm as a foreign substance length value b1 of the minor axis, thereby enabling analysis of the foreign substance as having an approximately oval shape.

Figure 5C:
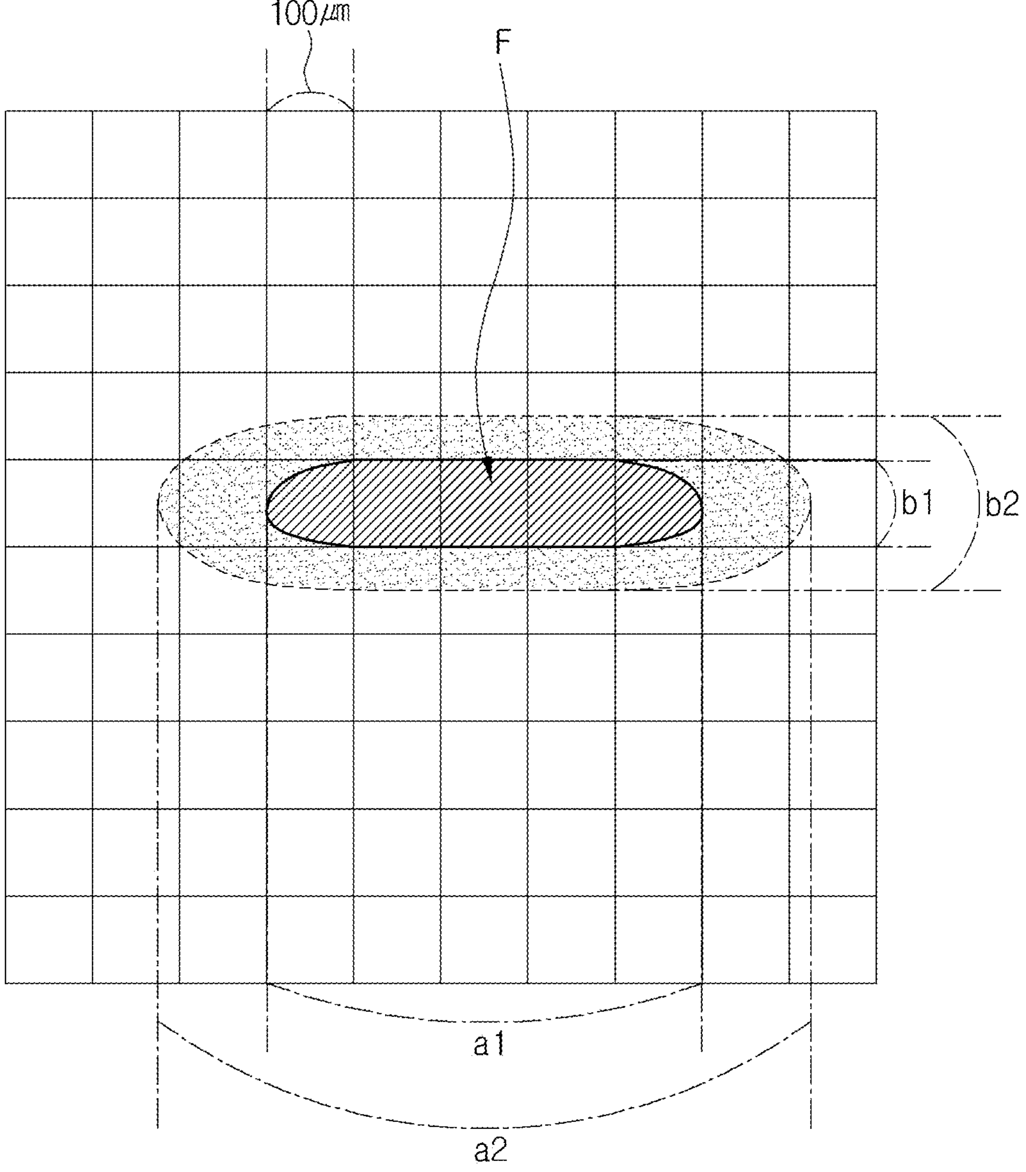

In addition, referring to FIG. 5C, when the foreign substance amplification length value calculation unit 440 calculates the foreign substance amplification length value a2 of the major axis of the light-scattered foreign substance F detected by the foreign substance detection unit 430 as 750 μm and the foreign substance amplification length value b2 of the minor axis as 200 μm, the foreign substance length value determination unit 450 derives 500 μm, which is the standard particle length value corresponding to the standard particle amplification length value of 750 μm, from the foreign substance length value comparison criterion storage unit 420 and determines 500 μm as the foreign substance length value a1 of the major axis, and derives 100 μm, which is the standard particle length value corresponding to the standard particle amplification length value of 200 μm, from the foreign substance length value comparison criterion storage unit 420 and determines 100 μm as the foreign substance length value b1 of the minor axis. In this way, since the length of the major axis is much longer than that of the minor axis, the foreign substance may be analyzed as a fibrous form.

As such, in the above-described embodiment, the size, shape, and the like of the foreign substance are derived through the foreign substance length values of the major and minor axes, but when the foreign substance length values calculated in directions other than the major and minor axes are added and analyzed together, a more accurate size, shape, or the like may be derived.

In addition, the user device 400 further includes a light scattering standard particle RGB value extraction unit 471, a foreign substance color comparison criterion storage unit 472, a light scattering foreign substance RGB value extraction unit 473, and a foreign substance color determination unit 474 to confirm the actual color of the foreign substance F from the light-scattered foreign substance F.

The light scattering standard particle RGB value extraction unit 471 irradiates light to standard particles for each color in advance with a predetermined light amount by the plurality of light sources 210 so that light is scattered by the standard particles, and extracts the light scattering standard particle RGB value from the image captured by the optical unit 300, and when this operation is repeated multiple times for each color of the standard particles, the range of the light scattering standard particle RGB values for each standard particle color is determined. For example, the range of the light scattering standard particle RGB values for standard particle colors such as black, white, red, green, blue, and yellow may be extracted. The light scattering standard particle RGB values may be expressed as ranges for each component of R, G, and B. For example, when the standard particle color is red, the range of the light scattering standard particle RGB values can be determined as $R \geq 200$, $50<G<150$, $50<B<150$.

RGB values are a way to express an image by mixing red (R), green (G), and blue (B). The image is made up of several very small squares called pixels, each pixel is made up of a combination of red, green, and blue, and each of red, green, and blue may be expressed as a number in 256 color levels from 0 to 255. For example, RGB (255,0,0) may be expressed as red, and RGB (255,100,0) may be expressed as red mixed with green. However, even when it is not the actual color of the standard particle, the light-scattered color of the standard particle also has the own RGB value, and the light scattering standard particle RGB values are expressed differently for each actual color of the standard particle.

The foreign substance color comparison criterion storage unit 472 matches the range of the light scattering standard particle RGB value and the standard particle color and stores as the comparison criterion for the foreign substance color.

The light scattering foreign substance RGB value extraction unit 473 extracts the light scattering foreign substance RGB values from the light-scattered image of the foreign substance F detected by the foreign substance detection unit 430. In this case, when the light scattering size of the foreign substance F in the image spans a plurality of pixels, a plurality of light scattering foreign substance RGB values may be extracted for each pixel, and since the light scattering foreign substance RGB values are all colors scattered by one foreign substance F, the plurality of light scattering foreign substance RGB values have similar ranges. For example, when the light-scattered size by a red foreign substance F spans the plurality of pixels, the plurality of light scattering foreign substance RGB values do not differ greatly from each other and have similar ranges.

The foreign substance color determination unit 474 searches for the range of the light scattering standard particle RGB values that include the light scattering foreign substance RGB values, and in this case, searches for the range of the light scattering standard particle RGB values in which the R, G, B components of the light scattering foreign substance RGB values are included in the range of the R, G, B components of the light scattering standard particle RGB values. Then, the standard particle color that matches the range of the searched light scattering standard particle RGB values is derived from the comparison criterion of the foreign substance color comparison criterion storage unit 472 and determined as the foreign substance color. In this way, by determining the color of the foreign substance, it is possible to easily determine where the foreign substance F originated, and thus additional inflow of the foreign substance F can be blocked. For example, when the color of the foreign substance is determined to be red, it may be determined that the foreign substance F has been transmitted from clothing of a worker.

Figure 5D:
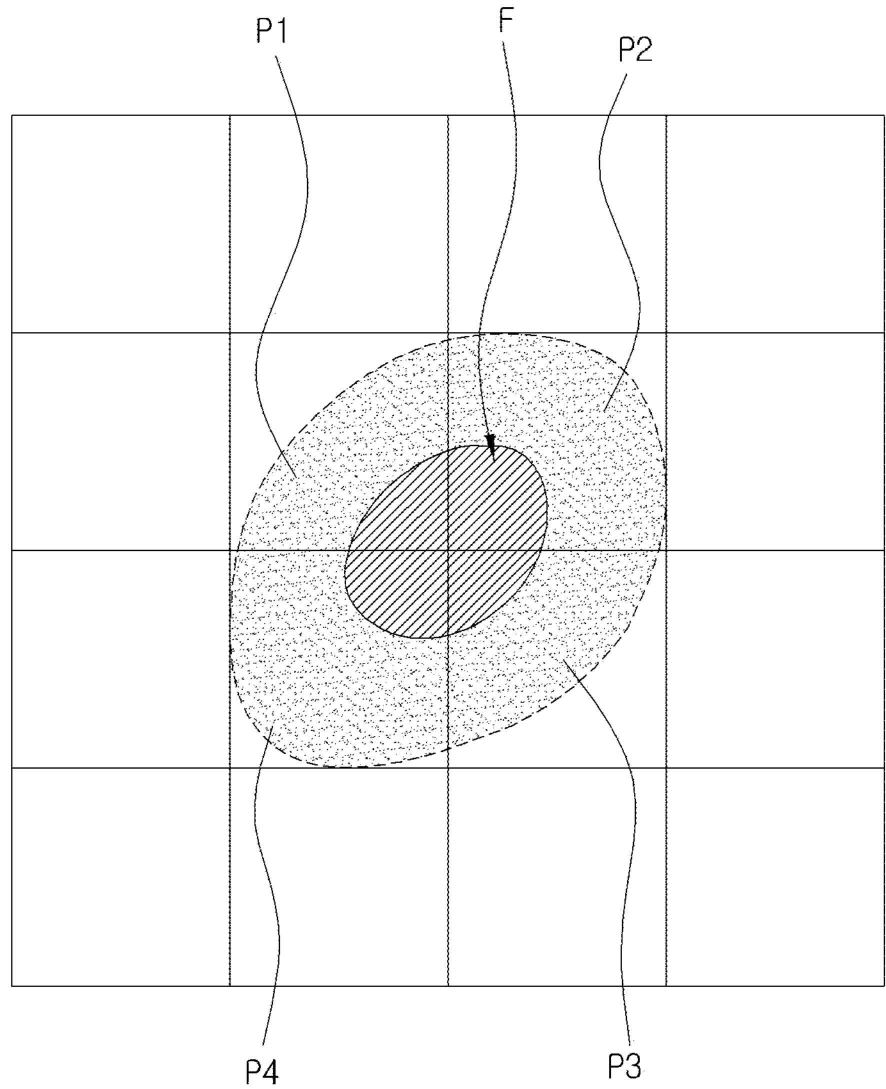

For example, in a case where the standard particle color is red, when it is assumed that the standard particle RGB values are stored in the foreign substance color comparison criterion storage unit 472 in the ranges of $R \geq 200$, $50<G<150$, $50<B<150$, referring to FIG. 5D, if the light-scattered foreign substance F from the image captured by the optical unit 300 spans four pixels, the light-scattered foreign substance RGB value extraction unit 473 of the user device 400 extracts the foreign substance RGB values for each pixel. At this time, in a case where the light scattering foreign substance RGB value of a first pixel P1 is RGB (220, 120, 120), the light scattering foreign substance RGB value of a second pixel P2 is RGB (210, 110, 90), the light scattering foreign substance RGB value of a third pixel P3 is RGB (210, 90, 110), and the light scattering foreign substance RGB value of a fourth pixel P4 is RGB (215, 120, 110), when the foreign substance color determination unit 474 compares the light scattering foreign substance RGB values of the four pixels with the range of the light scattering standard particle RGB values, it matches with red and thus determines the color of the foreign substance as red.

In addition, the foreign substance type analyzer may be installed to be connected to the optical unit 300 to analyze the type of foreign substance F contained in the target object M. For example, when a Raman spectrophotometer, a Fourier transform infrared spectroscopy (FT-IR), and the like are installed to be connected to the optical unit 300, the type of foreign substance F can be accurately analyzed. Since the analysis of foreign substances by the foreign substance type analyzer is already a known technology, detailed descriptions thereof are omitted.

According to the optical foreign substance detection device using light scattering and image analysis of the present invention, by using the light scattering and image analysis in combination, foreign substances can be detected and analyzed to confirm the actual size, shape, area, color, and the like of the foreign substances, and the path through which the foreign substances are introduced can be determined, thereby enabling contamination control in a clean room, the processing speed for foreign substance detection and image analysis is fast, foreign substances smaller than the pixel limit of the image sensor can be detected, foreign substance detection errors are prevented to ensure high reliability, and the detection device can be used by being placed on the target object without a stage, and the detection device is portable and can be easily moved to a target object for use, and therefore the present invention has industrial applicability.

The invention claimed is:

1. An optical foreign substance detection device using light scattering and image analysis to detect and analyze a foreign substance included in a target object, the optical foreign substance detection device comprising:

an optical housing;

a light irradiation unit that is connected to a lower portion of the optical housing, and has a plurality of light sources arranged to irradiate light toward the target object below, wherein the light sources irradiate light with a predetermined light amount so that light scattering is generated by a foreign substance;

an optical unit that is built into an upper portion of the optical housing, and captures the target object so that the foreign substance included in the target object is detected by using light scattering of the foreign substance by the light irradiated from the light source and creates an image; and a user device that receives, stores, reproduces, and analyzes the image created from the optical unit, wherein the user device calculates a light-scattered standard particle amplification length value by light irradiation according to a standard particle length value for multiple standard particles having a correlation in which a light scattering amplification ratio of the standard particle decreases as the standard particle length value increases, creates a graph regarding a correlation between the standard particle length value and the standard particle amplification length value, stores the graph as a comparison criterion for a foreign substance length value, calculates a light-scattered foreign substance amplification length value for the foreign substance detected from the image of the target object captured by the optical unit, derives a standard particle length value corresponding to the same standard particle amplification length value as the foreign substance amplification length value from the comparison criterion to determines the standard particle length value as the foreign substance length value, confirms a size, shape, and area of the foreign substance from the foreign substance length value, and confirms a color of the foreign substance from the light-scattered foreign substance, the user device includes:

a standard particle amplification length value calculation unit that calculates the light-scattered standard particle amplification length value according to each standard particle length value from an image light-scattered by the standard particles and captured by the optical unit by irradiating light with a predetermined light amount by the plurality of light sources to multiple standard particles having a correlation in which the light scattering amplification ratio of the standard particles decreases as the standard particle length value increases, a foreign substance length value comparison criterion storage unit that creates a graph regarding the correlation between the standard particle length value and the standard particle amplification length value and stores the graph as a comparison criterion for the foreign substance length value, a foreign substance detection unit that detects the light-scattered foreign substance from the image of the target object captured by the optical unit, a foreign substance amplification length value calculation unit that calculates the light-scattered foreign substance amplification length value of the foreign substance detected by the foreign substance detection unit, a foreign substance length value determination unit that derives a standard particle length value corresponding to the standard particle amplification length value that is the same as the foreign substance amplification length value from the foreign substance length value comparison criterion storage unit and determines the derived standard particle length value as the foreign substance length value, a foreign substance analysis unit that analyzes the size and shape of the foreign substance from the foreign substance length value determined by the foreign substance length value determination unit and calculates the area of the foreign substance, a determination unit that determines whether or not the target object is contaminated from information analyzed by the foreign substance analysis unit, a light scattering standard particle RGB value extraction unit that irradiates light to the standard particles by color in advance at a predetermined light amount by the plurality of light sources and extracts a light scattering standard particle RGB value from the image light-scattered by the standard particle and captured by the optical unit, a foreign substance color comparison criterion storage unit that matches a range of the light scattering standard particle RGB values with the color of the standard particles to store as a comparison criterion for the foreign substance color, a light scattering foreign substance RGB value extraction unit that extracts the light scattering foreign substance RGB values from the light-scattered image of the foreign substance detected by the foreign substance detection unit, and a foreign substance color determination unit that searches for a range of the light scattering standard particle RGB value including the light scattering foreign substance RGB value, derives a standard particle color matching the range of the searched light scattering standard particle RGB value from the foreign substance color comparison criterion storage unit, and determines the derived standard particle color as a foreign substance color, and the foreign substance amplification length value calculation unit calculates the foreign substance amplification length values of a major axis and a minor axis, respectively, and the foreign substance length value determination unit derives the foreign substance length values of the major axis and minor axis.

2. The optical foreign substance detection device of claim 1, wherein a light irradiation angle of the light source of the light irradiation unit to the target object is 1 to 60 degrees.

3. The optical foreign substance detection device of claim 1, wherein the light source of the light irradiation unit includes a plurality of lower light sources arranged symmetrically with each other, and a plurality of upper light sources arranged symmetrically with each other at a higher position than the lower light sources, and the lower light source and the upper light source are arranged alternately along a periphery of the light irradiation unit to irradiate light at different angles, a light irradiation angle of the lower light source is 1 to 30 degrees, and a light irradiation angle of the upper light source is 31 to 60 degrees.

4. The optical foreign substance detection device of claim 1, wherein the optical unit is built into an upper portion of the optical housing, the light irradiation unit is connected to a lower portion of the optical housing, the optical housing includes a light scattering unit having a diameter that decreases toward an upper portion between the optical unit and the light irradiation unit and providing a dark room so that the light scattering by the foreign substance occurs due to light irradiation of the light irradiation unit, and the optical housing has a handle formed on an outside of the optical housing.

5. The optical foreign substance detection device of claim 4, wherein the light irradiation unit includes a light irradiation ring formed in a ring shape by being connected to protrude outwardly in a lower portion of the light scattering unit and having a through hole formed on an inner side, a plurality of light sources installed along the inside of the light irradiation ring to irradiate light toward the target object from a plurality of directions, and a sealing ring formed in a lower portion of the light irradiation ring to allow for close contact with a surface of the target object.

6. The optical foreign substance detection device of claim 5, wherein the sealing ring contains 30 to 50% by weight of polyphenylene sulfide resin, 15 to 25% by weight of SBR, 10 to 20% by weight of polyurethane resin, 10 to 20% by weight of polymethyl methacrylate, 5 to 10% by weight of 2-mercaptoadenine, and 1 to 5% by weight of a light absorber.

7. The optical foreign substance detection device of claim 1, further comprising a foreign substance type analyzer that is connected to the optical unit and determines a type of foreign substance contained in the target object.

* * * * *